United States Patent [19]

Fromm

[11] Patent Number: 5,453,239
[45] Date of Patent: Sep. 26, 1995

[54] METHOD AND APPARATUS FOR CHARGING CALENDERS

[75] Inventor: Gerald Fromm, Wedemark, Germany

[73] Assignee: Paul Troester Maschinenfabrik, Hanover, Germany

[21] Appl. No.: 227,041

[22] Filed: Apr. 13, 1994

[30] Foreign Application Priority Data

Apr. 15, 1993 [DE] Germany .................... 43 12 272.8

[51] Int. Cl.⁶ ........................ B29C 43/24; B29C 43/58
[52] U.S. Cl. .................. 264/175; 264/40.7; 264/148; 425/140; 425/145; 425/363; 425/367
[58] Field of Search ................... 264/175, 148, 264/40.7, 40.4, 40.5; 425/363, 145, 367, 140

[56] References Cited

U.S. PATENT DOCUMENTS

| | | | |
|---|---|---|---|
| 1,743,302 | 1/1930 | Allen | 264/40.4 |
| 1,834,573 | 12/1931 | Cadden | 264/175 |
| 3,205,116 | 9/1965 | Walsh et al. | 425/363 |
| 3,858,857 | 1/1975 | Ulm | 425/145 |
| 3,898,024 | 8/1975 | Wockener | 425/145 |
| 4,014,636 | 3/1977 | Pawelczyk | 425/363 |
| 4,029,455 | 6/1977 | Schmidt et al. | 425/363 |

FOREIGN PATENT DOCUMENTS

| | | | |
|---|---|---|---|
| 0061385 | 9/1982 | European Pat. Off. | 264/175 |
| 916744 | 8/1954 | Germany | 425/363 |
| 426848 | 10/1974 | U.S.S.R. | 425/145 |
| 1495142 | 7/1989 | U.S.S.R. | 425/363 |

*Primary Examiner*—Jeffrey R. Thurlow
*Attorney, Agent, or Firm*—Emmanuel J. Lobato

[57] ABSTRACT

A method and charging apparatus for feeding successively individual strips of a deformable material to a calender for calendering under pressure between at least two rotatably driven calender rolls. The strips are produced from a strand of an elongated mass of deformable material provided from an extruder or rolling mill which is then cut into individual strips transported to a roller conveyor which positions them in a common plane successively at a selected or determined position extending transversely of the roller conveyor rollers in a direction parallel to the length direction of the calender rolls. An intermittently actuated pivotable belt conveyor having laterally spaced endless belts disposed below the roller conveyor and each aligned in a plane with a respective space between next-adjacent rollers of the roller conveyor lifts the individual strips off the roller conveyor to a higher level and advances the individual strips along a planar feed path at right angles to the path in which the strips are advanced into position transversely of the roller conveyor and inclined toward the calender rolls and delivers them to the calender individually by discharging them successively off a pivot end of the belt conveyor disposed adjacent the feed nip of the calender. The individual strips are delivered extending uniformly parallel lengthwise with the gap between the calender rolls into which they are drawn for producing uniform calender products. The belt conveyor endless belts have free ends intermittently cyclically lifted above the level of the roller conveyor and lowered synchronously by a lever mechanism actuated by an intermittently energized fluid powered cylinder for cyclically effecting lifting a free end of the endless belts upon a detector detecting that an individual strip is in proper position on the roller conveyor for delivery to the calender along the inclined feed path and restoring the belt conveyor to a lowered position below the level of the roller conveyor when an individual strip has been discharged to feed the calender rolls. In the lowered position the belt conveyor is in readiness for delivery of a next sucessive strip to the calender to be calendered.

13 Claims, 2 Drawing Sheets

METHOD AND APPARATUS FOR CHARGING CALENDERS

BACKGROUND OF THE INVENTION

The present invention relates generally to calenders and more particularly to a method and apparatus for charging a two- or multi-roll calender, in particular for rubber processing, consisting of conveyor belts and a cutting device for cutting strips of a deformable material to be fed into the calender. The strips are preferably produced from as an elongate mass or strand developed by an extruder or a rolling mill and then cut into strips.

The feeding of calenders is accomplished by various known devices, which convey the material to be fed to a feed point as a strip or flat billet.

It is a known practice to set up an extruder perpendicular to the axes of the calender rolls in front of the calender and to arrange between the extruder, and the gap to be fed between the calender rolls, a conveyor belt which is pivotable from one roll end of the calender to the other and back. As the speed of the pivoting of the conveyor belt is lower at the reversal points of the pivoting motion than in the central region between the reversal points, there results an uneven feeding; more material is supplied at the sides of the calender than in the middle region. As a result, material must be displaced toward the center if the product leaving the calender is not to be uneven.

It is also known for feeding a calender to set up a round billet extruder in the direction of the roll axes of the calender and to transport the billet on a conveyor belt to a position before the nip, to cut the billet off, and to tilt the end of the conveyor belt about its longitudinal direction or dimension so that the cut-off round billet falls into the calender nip. Since the round billet consists of a rubber mix which is sticky, often the transfer of the billet when pivoting the conveyor belt into the nip does not take place in the desired manner, as the billet does not roll off the side of the conveyor belt in the desired manner. Moreover, feeding a calender with round billet segments has the additional disadvantage that they are not drawn into the nip as well as wide or flat billet-like strips.

SUMMARY OF THE INVENTION

The invention avoids the disadvantages of the prior art. It is an object of the present invention to provide, with simple means, a simplified arrangement for feeding a calender entirely evenly relative to the central plane of the rolls over a desired width thereof or entirely evenly over the full width thereof.

The invention consists in that downstream of a cutting device arranged in the transport path a roller conveyor is arranged, the last roller of which forms the end of the transport path section extending in an axial direction of an extruder or rolling mill. Below the roller conveyor is disposed an upwardly pivotable transport device consisting of a belt conveyor having parallel belts, which continue the transport path at a right angle. The belts, on being pivoted, pass between the rollers of the roller conveyor into an upper pivoted position and in this upper pivoted position are disposed above the roller conveyor.

Preferably, the overall width of the roller conveyor and the width of the belt conveyor jointly correspond to the usable length of the calender rolls.

For conveying cut-off elastomer strips into the calender nip it is preferable to arrange the pivot axis of the pivotable belt conveyor in front of the gap between the calender rolls into which the cut-off elastomer strips, for example, of rubber, are to be fed.

The belt conveyor is preferably constructed so that the belt deflection wheels or pulleys are mounted on two shafts along the width of the belt conveyor. Care must be taken that the shaft disposed in the region of the roller conveyor does not come in contact with the roller conveyor. There are several possibilities of a satisfactory construction.

One possibility is to arrange the deflection rollers or pulleys of the belt conveyor on the free end removed from the pivot axis.

Another possibility is to make the size of the diameter of the deflection wheels of the belt conveyor such that in their highest pivoted position the belts have passed with their traveling upper runs through respective spaces between the next-adjacent rollers and are disposed above the roller conveyor.

Structurally it is advantageous if the roller conveyor rollers are rotatably mounted on one end; the roller beatings being disposed on the end of the roller conveyor away from the calender.

A simple construction is obtainable also by making the belt conveyor pivotable by means of an intermittently activated lever mechanism which consists of a lever engaging the frame of the belt conveyor and the power piston-cylinder unit intermittently energized for actuating the lever cyclically upwardly and downwardly.

As the rubber mix segments to be transported by the belts are often tacky, it is preferable to choose conveyor belts having a round cross section or V-belts made of a material not affected by tacky mixtures. V-belts have the advantage that the segments or strips being transported always lie on the top side, so that the flanks and the roller conveyor rollers and belt pulleys do not become fouled.

It is preferable for satisfactory positioning and transfer of the strips if the rollers of the roller conveyor are driven by motor.

To obtain a suitable distance or spacing of the segments or strips from one another, the section of the transport path downstream of the cutting device extending in the axis of the extruder or of the rolling mill is appropriately driven at a higher transport speed than the section of the transport path upstream of the cutting device.

BRIEF DESCRIPTION OF THE DRAWING

The essence of the invention will be explained more specifically below with reference to an example of realization embodiments represented schematically in the drawing, in which.

DESCRIPTION OF THE PREFERRED EMBODIMENTS

Figure 1:
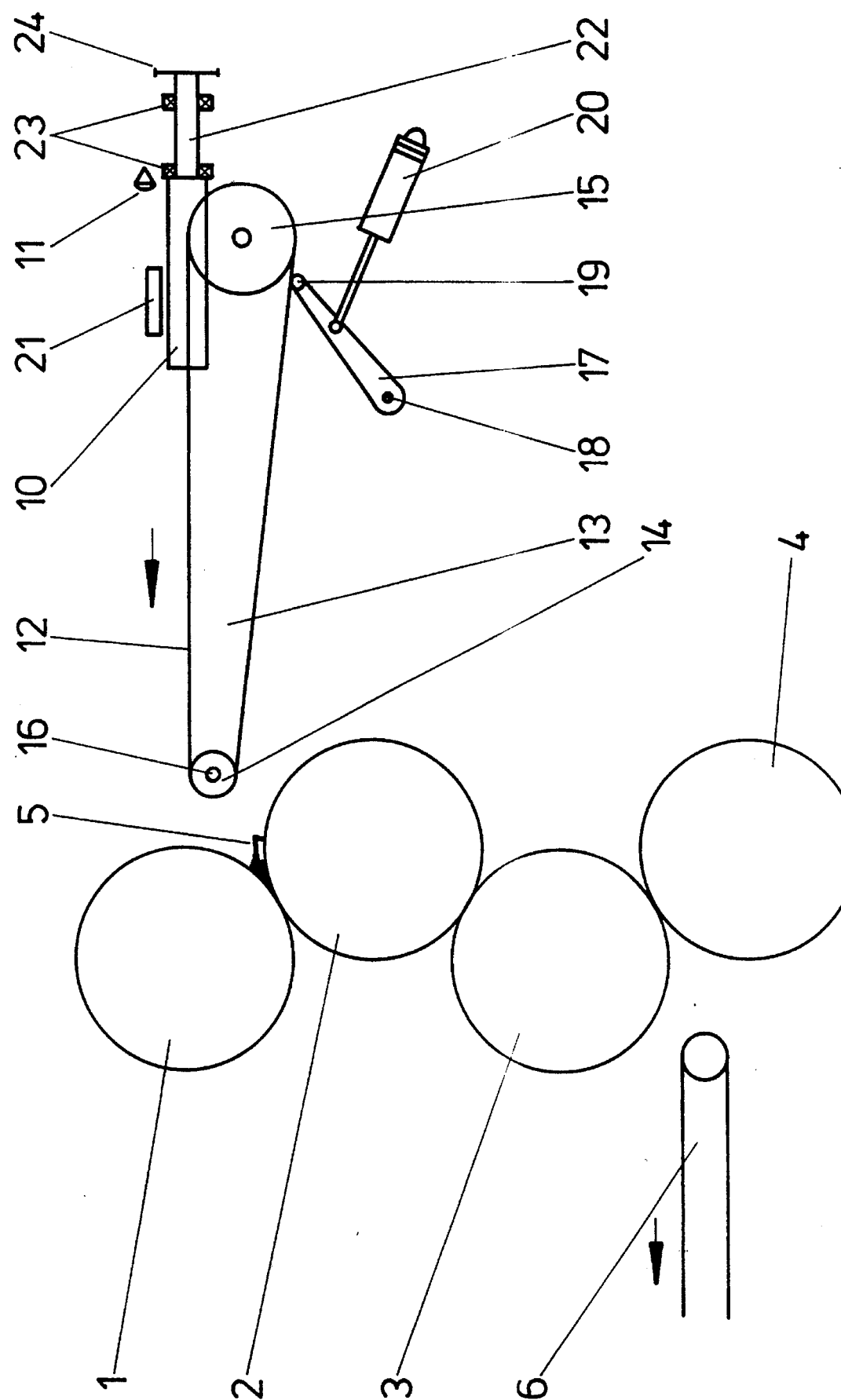
FIG. 1, is a schematic side elevation view of the charging apparatus, according to the invention.
Figure 2:
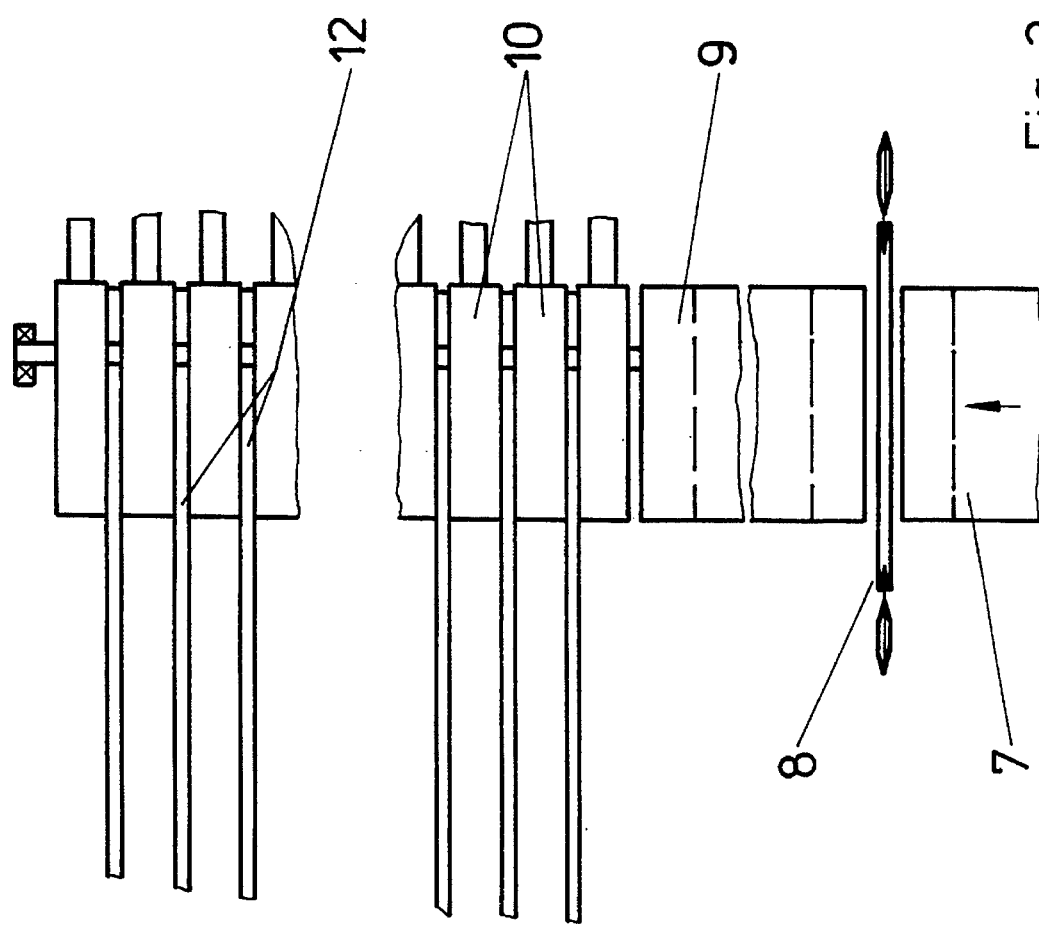
FIG. 2, is a fragmentary schematic plan view of the charging apparatus shown in FIG. 1.
Figure 2:
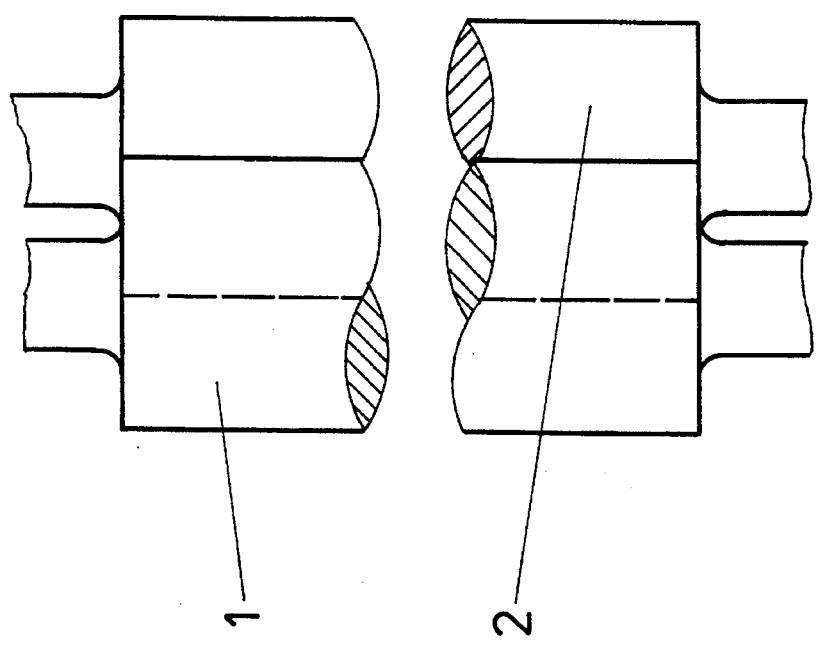

A four-roll calender shown in FIG. 1 has calenders or rolls 1, 2, 3 and 4 as shown. Between the rolls 1 and 2 is disposed a feed nip 5. The calendered product leaves the calender between rolls 3 and 4 and is transported away by a conveyor belt 6.

The calender is fed with a wide strip or strand of deformable material, which may be produced in an extruder or rolling mill, not shown, and is supplied via a conveyor belt 7. The strand is divided or cut into segments or strips by means of a cutting device 8. The segments or strips cut preferably have a length which corresponds to the usable calender roll width of the calender. These strips are conveyed via an additional conveyor belt 9 to a roller conveyor consisting of a plurality of laterally spaced rollers 10. At the roller conveyor a device for detection of the position of the individual strip segments is provided. It is, for example, a photoelectric cell 11 or the like, which initiates actuation of a lever mechanism, described herein, when the proper position of the feed strip has been reached. A plurality of laterally spaced belts 12 of a pivotable belt conveyor 13 can be selectively moved cyclically upwardly and downwardly through free spaces between the rollers 10. The belts 12 are tensioned and driven via deflection wheels or pulleys 14 and 15. The belt conveyor 13 is pivotable about a shaft 16, which also carries drive pulleys or wheels 14. The individual belts are disposed in planes between the rollers of the roller conveyor.

The pivoting is effected by means of a lever mechanism consisting of levers 17 pivotable about a shaft 18 and carry on a free end rollers 19 or a slide bearing, and are pivoted by means of a fluid-powered piston-cylinder units 20.

In a position of rest the belt conveyor 13 is below the rollers 10 of the roller conveyor. If the belt conveyor 13 is to transport a billet or strip 21, detected by the detector 11 as being in position lying on the rollers 10, into the feed nip 5, the belt conveyor 13 is pivoted upwardly by the piston-cylinder unit 20, which is cyclically pressure fluid energized from a controlled fluid system, not shown, the belts 12 pass through the free spaces between the laterally spaced rollers 10 and lift the billet segment 21 off the rollers 10. Then the billet segment 21 is introduced into the feed nip 5 by the traveling upper runs of the belts 12 and the belt conveyor is then restored to its lowered position by the lever mechanism actuated by the cyclically energized unit 20 which effects the lifting and lowering upon generation of the detection signal, from the detector 11, which is applied to circuitry of a control system to control the operation of the fluid system cyclically.

The rollers 10 of the roller conveyor are supported on one end. On an end of the rollers 10 away from the calender rolls 1, 2, 3, 4, a shaft 22 or extension extends axially from each roller. The roller shaft is mounted in bearings 23 and at whose free end a drive wheel 24 for the roller drive is arranged.

It may be useful to arrange the beatings 23 spaced from the rollers 10, so that singly mounted deflection wheels 15 can pass through the free spaces between the adjacent shafts 22 in the region between the roller 10 and the beating 23. This distance is of advantage also when deflection wheels 15 of a larger diameter are used. This larger diameter of the deflection wheels 15 is chosen when the deflection wheels or pulleys 15 are arranged on a common shaft and only the transporting upper run of the belts 12 passes through the free spaces between the rollers 10 and in the upper pivot position the shaft carrying the deflection wheels 15 remains below the shafts 22.

I claim:

1. A charging apparatus for use with a calender having at least two parallel rotably driven calender rolls and a transport conveyor for receiving an endless compound strip of deformable elastomeric material from an extruder or a rolling mill and the like and a cutting device for cutting the strip of elastomeric deformable material into individual strips of a selected length, the two parallel calender rolls having a feed nip therebetween for receiving the individual strips successively charged into the calender at said feed nip for calendering thereof; the charging apparatus comprising;

a roller conveyor downstream of the cutting device and the transport conveyor for receiving from the cutting device in succession the individual strips of material to be calendered;

said roller conveyor comprising a plurality of cylindrical parallel rollers laterally spaced disposed extending axially in a common direction at right angles to the direction in which the calender rolls extend and in a direction at right angles to a transport path direction of the individual strips on the roller conveyor transported longitudinally in a selected plane;

a pivotable belt conveyor comprising a plurality of endless belts laterally spaced each narrower in width than the width of the individual rollers of the roller conveyor and each having an upper run parallel with upper runs of other endless belts of said plurality extending longitudinally in a common direction parallel to the rollers of the roller conveyor, said upper runs being disposed at a level below said selected plane when the belt conveyor is in a lowered position in a non-pivoted state and movable upwardly to a level above said selected plane through respective spaces between laterally spaced next-adjacent rollers of the roller conveyor when the belt conveyor is actuated to a pivoted state;

means for defining a pivot for each endless belt at respective ends thereof disposed spaced from the roller conveyor in a direction toward the calender rolls above and proximate to said feed nip;

means for selectively pivoting the endless belts of the belt conveyor synchronously about the pivot thereof to incline the belt upper runs toward the calender rolls for uniformly charging the individual strips of deformable material into the calender rolls comprising means for lifting upwardly synchronously the endless belts at free ends thereof spaced away from the pivot to said level above said selected plane on which said individual strips are disposed on said roller conveyor rollers so that traveling upper runs of the endless belts simultaneously lift from the roller conveyor an individually strip of deformable material disposed extending transversely of the upper runs of the endless belts and extending uniformly in a direction parallel to longitudinal axes of the calender rolls for effecting advancing of the individual strip lifted along a feed path inclined toward the calender rolls and charging successive individual strips of deformable material into the calender rolls field nips with each individual strip fed to the calender rolls uniformly parallel with the calender rolls and for subsequently restoring the bell conveyor to said lowered position after each sucessive feeding of an individual strip to said calender rolls;

means for detecting that successive individual strips are disposed extending transversely of the conveyor rollers at a selected position in readiness for being lifted successively by said endless belts of said belt conveyor for advancing thereof along said feed path; and means for initiating said pivoting of the belt conveyor upon each detection that an individual strip of deformable material is disposed extending transversely of the roller conveyor rollers at said selected position and thereby in readiness for being lifted individually and charged into the calender individually by said belt conveyor.

2. Apparatus according to claim 1, in which said roller conveyor and the belt conveyor jointly have an overall width corresponding to an axial length of the calender rolls effectively used in calendering the deformable material of the individual strips.

3. Apparatus according to claim 1, in which said pivot is common to all of said endless belts and disposed very near to the feed nip.

4. Apparatus according to claim 1, in which said endless belts are V-belts.

5. Apparatus according to claim 1, in which said endless belts are circular in cross section.

6. Apparatus according to claim 1, in which each of said rollers of the roller conveyor has a respective axial extension at an end thereof remote from the calender and extending in a direction away from the calender for mounting the individual rollers on beatings for rotation.

7. Apparatus according to claim 1, in which said means for selectively pivoting the belt conveyor comprises a lever mechanism having at least one lever selectively actuated for engaging the belt conveyor and raising it from the lowered position to the raised position, and an actuating cylinder having a powered piston and piston rod connected to said lever and selectively energized for cyclically lifting and lowering the belt conveyor under control of the actuating cylinder.

8. Apparatus according to claim 1, in which the strips of deformable material are shaped flat strips.

9. Apparatus according to claim 1, in which said means for initiating said pivoting of the belt conveyor comprises a detector for detecting the position of the individual strips on the roller conveyor.

10. Apparatus according to claim 1, in which said means for driving the endless belts comprises for each endless belt a pulley disposed at said pivot and for each belt a pulley of substantially greater diameter at said free ends of the belts, so that the endless belt upper runs will be above said roller when said belt conveyor is pivoted, and means rotatably mounting the larger diameter pulleys disposed constantly below said rollers when said belt conveyor is pivoted.

11. A method for charging a calender having at least two parallel calender rolls rotatably driven for calendering under pressure deformable material in the form of elongate strips comprising;

producing elongate individual flat strips of a deformable material to be charged individually into a feed nip of the calender rolls for calendering thereof under pressure developed between the two calender rolls;

during the production of said strips advancing individually the strips in succession along a path to a determined position in the path in a selected plane with the individual strips at said position extending in a direction parallel to the direction of the axes of the calender rolls;

lifting an individual strip off of said selected plane while at said position and raising the individual strip to a higher level and while lifting the strip advancing the strip along an inclined feed path downwardly toward the calender rolls still maintaining a full length of the strip disposed in said inclined path parallel to the direction of the axes of the calender rolls;

discharging the strip from an end of said inclined feed path above and proximate to a feed nip of the calender rolls adjacent said end of the inclined feed path with the feed length of the strip positively maintained parallel to the axes of the calender rolls while being discharged; and repetitively repeating sequentially the steps of lifting an individual strip off the selected plane while at said determined position, advancing the lifted strip along an inclined feed path and the discharging of a strip from said feed path to the feed nip to repetitively charge the calender with individual strips having the full length of the individual strips uniformly disposed parallel to the longitudinal axes of the calender rolls.

12. A method for charging a calender according to claim 11, in which said flat strips are of a length corresponding to the length of said feed nip.

13. A method for charging a calender according to claim 11, in which said strips are advanced longitudinally to said position on a roller conveyor and disposed parallel to a direction in which longitudinal axes of the calender rolls extend.

* * * * *